United States Patent [19]

Schonfeld et al.

[11] Patent Number: 4,809,957
[45] Date of Patent: Mar. 7, 1989

[54] LEVEL CONTROL ARRANGEMENT FOR VEHICLES HAVING AIR SPRINGS

[75] Inventors: Karl-Heinrich Schonfeld, Hanover; Wolfgang Kaltenthaler, Wennigsen; Volker Meyer, Gottingen; Jorg Vanselow, Ronnenberg, all of Fed. Rep. of Germany

[73] Assignee: Wabco Westinghouse Fahrzeugbremsen GmbH, Hanover, Fed. Rep. of Germany

[21] Appl. No.: 935,449

[22] Filed: Nov. 26, 1986

[30] Foreign Application Priority Data

Dec. 5, 1985 [DE] Fed. Rep. of Germany ....... 3542975

[51] Int. Cl.$^4$ .................. B60G 11/26; F16F 5/00
[52] U.S. Cl. .................... 267/64.11; 280/6.1; 280/702; 280/704; 280/707; 280/711; 280/712; 280/714; 280/840
[58] Field of Search ............... 280/6.1, 6 R, 704, 702, 280/711, 712, 707, 714; 267/64.11-64.21, DIG. 1, DIG. 2

[56] References Cited

U.S. PATENT DOCUMENTS

| | | | |
|---|---|---|---|
| 4,327,936 | 5/1982 | Sekiguchi | 280/711 |
| 4,354,693 | 10/1982 | Maeda | 280/714 |
| 4,393,959 | 7/1983 | Acker | 280/714 |
| 4,462,610 | 7/1984 | Saito et al. | 280/714 |
| 4,465,297 | 8/1984 | Yamahara | 280/711 |
| 4,504,081 | 3/1985 | Shimizu et al. | 280/714 |
| 4,568,093 | 2/1986 | Shimizu et al. | 280/702 |

FOREIGN PATENT DOCUMENTS 1914696 10/1969 Fed. Rep. of Germany .

Primary Examiner—Andres Kashnikow
Assistant Examiner—Mark T. Le
Attorney, Agent, or Firm—J. B. Sotak

[57] ABSTRACT

A level control system for motor vehicles having pneumatic springs which function in accordance with the vehicle load. A specified distance is normally maintained between the vehicle body the vehicle axle. This distance is maintained by charging or discharging the pneumatic springs. The level control system includes an air dryer and a pneumatic relay type of controllable discharge valve having a relatively large cross-sectional port by which the air dryer is connected to the atmosphere. The discharge valve operates against a spring return force. The magnitude of the spring return force corresponds to a preselected minimum pneumatic spring pressure. The system counteracts an icing action of the discharge valve and prevents an unintentional and complete discharging of the pneumatic springs.

4 Claims, 2 Drawing Sheets

LEVEL CONTROL ARRANGEMENT FOR VEHICLES HAVING AIR SPRINGS

FIELD OF THE INVENTION

The invention relates to a level control apparatus for motor vehicles with pneumatic springs.

BACKGROUND OF THE INVENTION

On motor vehicles with pneumatic springs, a load-controlled level control os generally used. The quantity of air in the spring bellows of the pneumatic spring is thereby regulated as a function of the vehicle load, so that a specified distance is always present between the vehicle body and the vehicle axle.

An arrangement of the type described above is disclosed in the published German patent application No. DE-OS 30 31 453, which corresponds to U.S. Pat. No. 4,354,693. This apparatus of the prior art consists essentially of the following parts.

In practice, a distance measurement apparatus measures the distance of the vehicle body from the vehicle axle, which changes as the vehicle is loaded or unloaded. The measurement data are compared with a specified value, namely, the standard level by means of an electronic evaluation circuit. When a deviation occurs, the standard level is re-established by charging or discharging of the pneumatic springs. During pressurization, the electronic system switches a pneumatic spring valve between the pressure medium source and the pneumatic springs to the open position, and causes the pressure medium source to pump air from the pressure medium source into the pneumatic springs, until the electronic system recognizes the standard level indicated by the distance measurement apparatus. The flow of compressed air is then shut off, and the pneumatic spring valve is closed. The discharging occurs when the electronic system opens the pneumatic spring valve, and a second multi-way valve is open to the atmosphere. The pneumatic springs are then discharged into the atmosphere until the electronic system recognizes the standard level and closes both valves.

An air dryer integrated into the apparatus of the prior art is located so that, during pressurization, it carries the flow in one direction, and during discharge, it carries the flow in the opposite direction. During the discharge period, the moisture captured and collected in the air dryer is discharged into the atmosphere via the discharge valve located behind the outlet of the air dryer. The discharge valve is electromagnetically switched by the electronic system. It has been found that valves like those in question, which are designed to remove moisture, have a tendency to ice up and consequently become inoperable at low temperatures. This causes a particular disadvantage for magnetically-controlled valves, since there is only limited space available for installation and the limited power of the magnets, which results from even minor icing the force of the magnets to be restricted. Thus, the cross-sectional opening for the flowing medium is limited, so that proper operation can be a problem.

Another disadvantage of the previous apparatus is that, when the vehicle is jacked up and the pneumatic spring system is operational, the distance measurement apparatus can simulate a non-existent unloading to the electronic system. Under this condition, the electronic system maintains the connection between the pneumatic springs and the atmosphere, which can result in a complete discharging of the pneumatic springs. The resumption of vehicle operation with such completely discharged pneumatic springs can lead to damage to the bellows of the pneumatic springs, until the level control system resumes functioning.

OBJECTIONS AND SUMMARY OF THE INVENTION

Accordingly, an object of the invention is to provide an improvement of the apparatus described above, so that operational capabilities are not adversely affected at low freezing temperatures, and the pressure in the pneumatic springs will not drop below a specified minimum pressure no matter what the operating conditions.

Another object of the present invention is to provide level control apparatus for motor vehicles having at least one pneumatic spring by means of which a specified distance is maintained between a vehicle body and at least one vehicle axle comprising, a pressure medium source for pressurizing the pneumatic spring, the pneumatic spring being connected to the pressure medium source by an air dryer during a drying phase, the pneumatic spring being connected to the atmosphere by the air dryer and a first multi-way valve during a regeneration phase, the air dryer is connected to a first check valve for opening the pneumatic spring, a second check valve is connected to the air dryer through a controllable second multi-way valve from the pneumatic spring, the first multi-way valve is pneumatically controlled so that its pneumatic control input is pressurized with a pressure corresponding to the pressure in the pneumatic spring to oppose a spring return force which acts on the pneumatic-control input.

A further object of this invention is to provide a level control arrangement for vehicles with air springs which maintain a predetermined distance between vehicle body and vehicle axle dependent from vehicle load. The distance is held by charging or discharging the air springs. The arrangement contains an air dryer and an air drain valve which is pneumatically controlled in a relay manner to open a relatively large cross-sectional port by which the air dryer is connected to the atmosphere. The air drain valve works against a spring restoring force. The magnitude of the spring restoring force corresponds to a preselected minimum air spring pressure. The arrangement has an antifreezing action on the venting drain valve and also prevents the air springs from being completely and unintentionally discharged.

The present invention has the advantage that the pneumatic control connection of the first multi-way valve serving as the ventilation or exhaust valve can be pressurized via a relay-type control with the relatively high pressure of the pneumatic spring system, and consequently the ventilation valve can be equipped with a desirable flow cross-section.

BRIEF DESCRIPTION OF THE DRAWINGS

The invention is explained in greater detail below, with reference to the two embodiments which are illustrated in FIGS. 1 and 2 of the drawings, in which the same parts or components are represented by the same numbers.

DETAILED DESCRIPTION OF THE INVENTION

Figure 1:
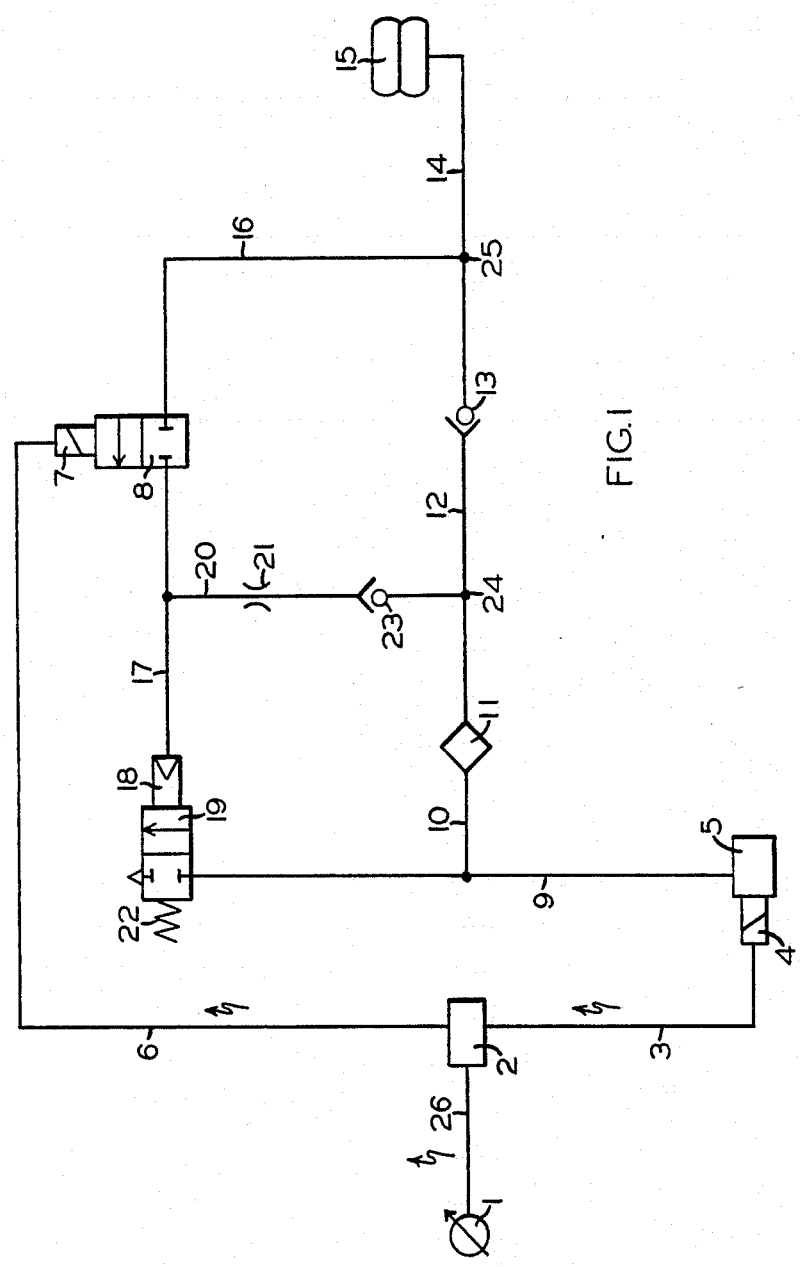

As shown, FIG. 1 a pneumatic spring 15 is schematically illustrated and is representative of all the other pneumatic springs on the vehicle. The pneumatic or air spring 15 is connected to a suitable pressure medium source 5 and is connected to a first pneumatically-controlled multi-way drain valve 19 for discharging or exhausing into the atmosphere. The first multi-way valve 19 has a pneumatic control input 18 which is pressurized by means of a first electrically controlled multi-way valve 8. The valve functions as a pneumatic spring valve and has a pressure corresponding to the pressure in the pneumatic spring 15 which works against a return force of the spring 22 acting on the pneumatic control input 18.

An air dryer 11 is connected via a first check valve 13 to the input of the pneumatic spring 15. The air dryer 11 is also connected to a second check valve 23. Thus, the air dryer 11 is connected via the multi-way valve 8 to the pneumatic spring 15. Upstream of the second check valve 23 there is a throttle or choke valve 21. Thus, the second check valve 23 is connected with the pressure medium output of the multi-way valve 8.

The pneumatic control input 18 of the first multi-way valve 19 is connected via a line 20 to the air dryer 11 and also the pressure medium output of the multi-way valve 8. As noted above, the throttle 21 and the second check valve 23 are located in line 20.

A distance measurement device 1 measures the distance or level of the vehicle body from the vehicle axle. The device 1 is connected by means of an electrical line 26 to an appropriate electronic control unit 2. The electronic control unit 2 includes an integraded evaluation circuit which is pre-programmed to a height-selected value which corresponds to a preset standard level. The actual level is measured by the distance measurement device 1 and is compared to the standard value stored in the evaluation circuit. The electrical control signal of the electronic control unit 2, which is a function of the level comparison, are fed by an electrical line 3 to electrical control terminal 4 of the pressure medium source 5 and by an electrical line 6 to an electrical control terminal 7 of the multi-way valve 8.

If the measured level value is less than the standard level, then the electronic control unit 2 turns on the pressure medium source 5. Normally, air pressure is supplied from source 5 to the pneumatic spring 15 via a charge path including the pneumatic pressure lines 9 and 10, the air dryer 11, a pressure line 12, the check valve 13 and a pressure line 14. The pressure continues until the standard level is reached so that the electronic control unit 2 again turns off the pressure medium source 5.

If the measured level value is greater than the standard level, the pneumatic spring 15 is discharged or exhausted to the atmosphere. Under this condition, the pressure medium source 5 is turned off until the standard level is reached. To accomplish this, the electronic control unit 2 switches the pneumatic multi-way valve 8 from the closed position to the open position. The pressure medium flows out of the pneumatic springs 15 and travels through a pressure fluid path including the pressure lines 14, 16, the opened multi-way valve 8, and the pressure line 17 to the pneumatic control input 18 of the multi-way valve 19 which switches to the position in which it is open to the atmosphere. The pressure line 20, the choke valve 21, and the check valve 23 are serially connected between the air dryer 11 and the multi-way valve 8. Thus, the pneumatic spring 15 is then connected to the atmosphere via a discharge path including the pressure lines 14, 16, the opened multi-way valve 8, the pressure line 20, the choke valve 21, the check valve 23, the dryer 11, the pressure lines 10 and 9 and the opened first multi-way valve 19 until the distance measurement device 1 again indicates that the standard level has been reached. At that time, the electronic control unit 2 again switches the multi-way valve 8 back to the closed position. During the discharging of the pneumatic spring 15, the end of pressure line 9 leading to the pressure medium source 5 is closed off by the control signal from the control unit 2 to the electrical control terminal 4 via line 3. The pressure acting on the control input is then equalized to the atmospheric pressure via the connection lines 17, 20, the dryer 11, the connection lines 10, 9 until the return force 22 moves the multi-way valve 19 into the closed position.

Figure 2:
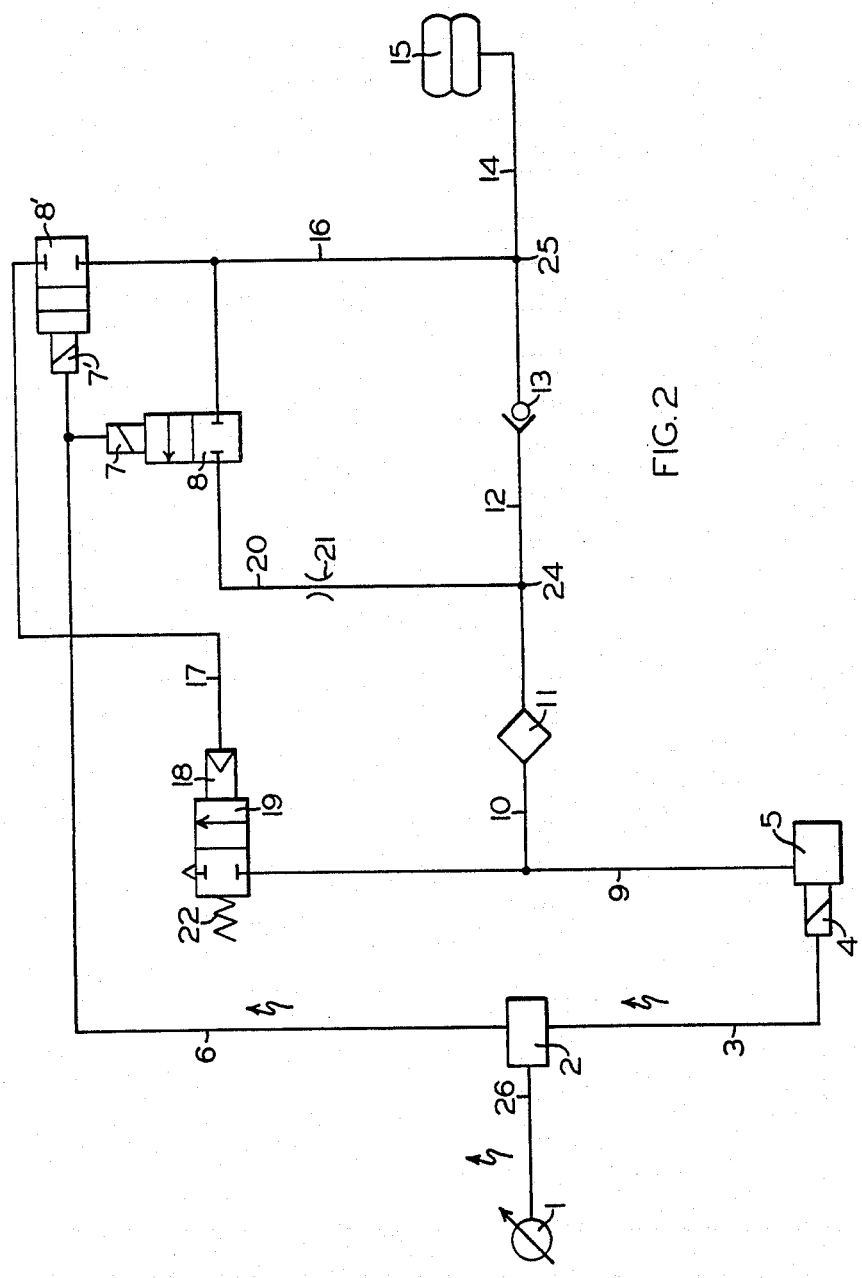

Instead of activating the pneumatic control input 18 by the multi-way valve 8, it will be realized that an additional or second electrically controlled multi-way valve 8' including electrical control terminal 7', as shown in FIG. 2, can also be used. This additional multi-way valve 8', the operation of which would be the same as that of the multi-way valve 8, would then be connected in parallel to the latter. Thus, the additional multi-way valve 8' is connected to the pressure line 16 and the control input 18. The portion of the pressure line 17 leading from the pressure line 20 to the control input 18 could then be eliminated. The electrical activation of the multi-way valve 8 and of the additional multi-way valve 8' would also be controlled by the electronic control unit 2.

The air dryer 11 is operated in its drying mode, or phase, during the pressurization of the pneumatic spring 15 and is operated in its regenerating mode, or phase, during the discharging of the pneumatic spring 15.

It will be appreciated that with throttle 21 located in the pressure line 20 it is certain that the discharged air will be conveyed to the air dryer during the discharging phase. Further, the throttle 21 makes certain that the requisite pressure will be maintained at the control input 18 during the discharging phase.

Since a relatively large cross-sectional flow area is presented by the multi-way valve 19 to the atmosphere during the discharging phase, the moisture collected during the pressurization phase in the air dryer 11 is discharged into the atmosphere. The granulated material or desiccant in the air dryer is regenerated. The regeneration process is assisted by the fact that the air which flows through the granulated desiccant is depressurized, it can be returned to the atmosphere without dust through the relatively large cross-sectional flow area of the multi-way valve 19.

The pneumatic control input 18 of the multi-way valve 19 is pressurized by a pressure which corresponds to the pressure in the pneumatic spring 15. The conmparatively high switching forces allow a unique configuration of the multi-way valve 19 so that a relatively large cross-sectional flow area is presented to the atmosphere. This counteracts any icing being formed on the switching elements. If any ice-up occurs, the high switching forces will knock off the ice particles.

The multi-way valve 19 is provide with a return force by spring 22. Thus, the spring 22 acts in opposition to the pressure on the control input 18. The return force of the spring 22 is designed to be a specified minimum pressure in relation to the pneumatic springs 15. If, as a result of faulty information, for example, when the vehicle is jacked up while the air suspension system is operational, the electronic control unit 2 will not terminate the discharging process by switching back the pneumatic valve 8. Thus, the pneumatic spring 15 is not competely discharged. That is, the return force of the spring 22 closes the connection output of valve 19 to the atmosphere as soon as a pressure is achieved at the control input 18 which corresponds to the specified minimum pressure of the pneumatic spring 15.

The check valve 23, which is located in the line 20 between the throttle 21 and the air dryer 11, closes the connection to the control input 18 during the charging process. The multi-way valve 19 is thereby prevented from switching to the atmosphere during the charging phase.

The check valve 13 which is located in the connecting points 24 and 25 of the pressure line 16, 17, 20 acts as a return flow line and closes the connection between the pneumatic spring 15 and the air dryer 11 during the discharging process.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A level control apparatus for motor vehicles having at least one pneumatic spring by means of which a specified distance is maintained between a vehicle body and at least one vehicle axle, comprising:
   (a) a pressure medium source for pressurizing the pneumatic spring;
   (b) the pneumatic spring is connected to the pressure medium source via a charge path including an air dryer and a first check valve during a drying phase;
   (c) the pneumatic spring is connected to the atmosphere via discharge path including an electrically controlled multi-way valve, a choke valve, a second check valve, the air dryer, and a pneumatically controlled multi-way valve during a regeneration phase;
   (d) first check valve prevents the flow of air from the pneumatic spring during the regeneration phase;
   (e) the second check valve prevents the flow of air from the pressure medium source to the pneumatically controlled multi-way valve during the drying phase; and
   (f) the pneumatically controlled multi-way valve include a pneumatic control input which is pressurized with a pressure corresponding to the pressure in the pneumatic spring to oppose a spring return force which acts on the pneumatic control input.

2. The level control apparatus according to claim 1, wherein the pneumatic control input of the pneumatically controlled multi-way valve is connected to a connection line which connects the air dryer to the atmosphere during the regeneration phase.

3. The level control apparatus according to claim 1, wherein the choke valve maintains the requisite pressure at the pneumatic control input of the pneumatically controlled multi-way valve during the regeneration phase.

4. A level control apparatus for motor vehicles having at least one pneumatic spring by means of which a specified distance is maintained between a vehicle body and at least one vehicle axle, comprising:
   (a) a pressure medium source for pressurizing the pneumatic spring;
   (b) the pneumatic spring is connected to the pressure medium source via a charge path including an air dryer and a check valve during a drying phase;
   (c) the pneumatic spring is connected to the atmosphere via a discharge path including a first electrically controlled multi-way valve, a choke valve, the air dryer, and a pneumatically controlled multi-way valve during a regeneration phase;
   (d) the air dryer is connected to the check valve for opening the pneumatic spring;
   (e) a second electrically controlled multi-way valve connects the pneumatic spring to the pneumatically controlled multi-way valve during the regeneration phase; and
   (f) the pneumatically controlled multi-way valve includes a pneumatic control input which is pressurized with a pressure corresponding to the pressure in the pneumatic spring to oppose a spring return force which acts on the pneumatic control input.

* * * * *

UNITED STATES PATENT AND TRADEMARK OFFICE
CERTIFICATE OF CORRECTION

PATENT NO. : 4,809,957
DATED : March 7, 1989
INVENTOR(S) : Karl-Heinrich Schonfeld, Wolfgang Kaltenthaler, Volker Meyer, and Jorg Vanselow It is certified that error appears in the above-identified patent and that said Letters Patent is hereby corrected as shown below:

Column 5, line 44, after "via" insert --a--

Column 6, line 1, before "first" insert --the-- line 8, delete "include" and insert --includes--

Signed and Sealed this

Second Day of January, 1990

Attest:

JEFFREY M. SAMUELS

*Attesting Officer*        *Acting Commissioner of Patents and Trademarks*